United States Patent [19]

Haentjens et al.

[11] Patent Number: 4,877,532

[45] Date of Patent: Oct. 31, 1989

[54] CENTRIFUGAL OXYGENATOR AND METHOD FOR TREATMENT OF WASTE WATER

[75] Inventors: Walter D. Haentjens; Thomas E. Stirling, both of Sugarloaf, Pa.

[73] Assignee: Barrett, Haentjens & Company, Hazelton, Pa.

[21] Appl. No.: 100,107

[22] Filed: Sep. 23, 1987

Related U.S. Application Data

[63] Continuation of Ser. No. 903,506, Sep. 4, 1986, abandoned.

[51] Int. Cl.$^4$ ................................................ C02F 3/26
[52] U.S. Cl. ...................................... 210/629; 210/219; 210/221.2; 210/926
[58] Field of Search ...................... 210/219, 220, 221.1, 210/221.2, 629, 926; 261/36.1, 37, 87, 64.3, 93; 415/206, 207

[56] References Cited

U.S. PATENT DOCUMENTS

| 3,365,178 | 1/1968 | Bood | 261/93 |
| 3,663,117 | 5/1972 | Warren | 261/93 |
| 3,918,829 | 11/1975 | Korzec | 415/207 |
| 3,948,492 | 4/1976 | Hege | 261/87 |
| 4,051,204 | 9/1977 | Müeller et al. | 261/36.1 |
| 4,242,289 | 12/1980 | Blum | 261/93 |

Primary Examiner—Michael S. Marcus
Attorney, Agent, or Firm—Hill, Van Santen, Steadman & Simpson

[57] ABSTRACT

Apparatus for increasing the efficiency of absorption of oxygen by biodegradable waste and particle break-up thereof, by introducing waste and gas, which may be air, into a collector under a highly agitated state, and agitating the air and waste under pressure in the collector by the impeller of a vortex type centrifugal pump as back pressure is provided to the collector. The collector is mis-matched relative to the impeller to increase the retention and mixing time of the air and waste in the collector.

13 Claims, 3 Drawing Sheets

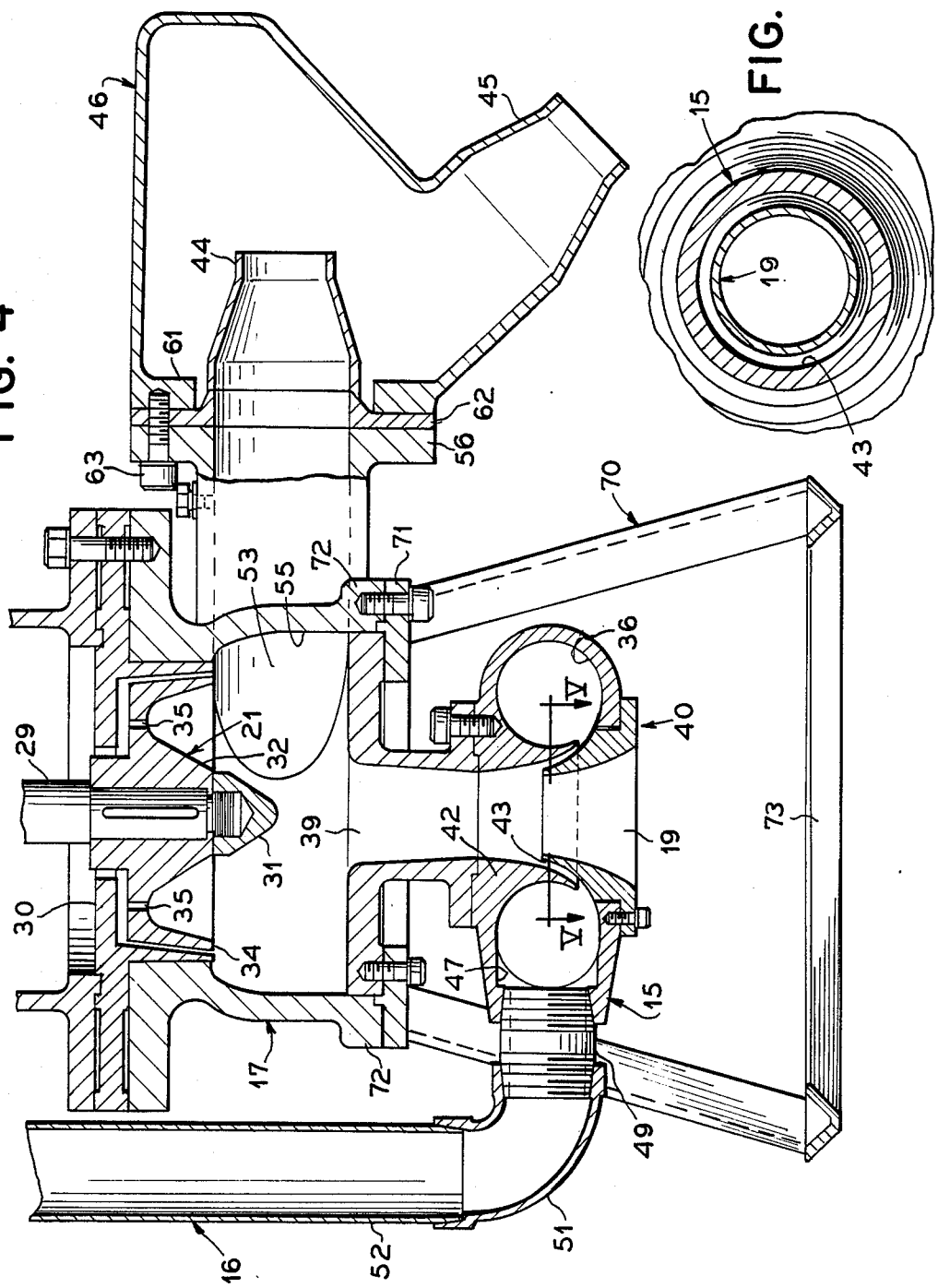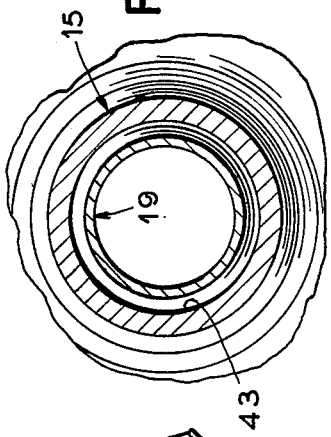

CENTRIFUGAL OXYGENATOR AND METHOD FOR TREATMENT OF WASTE WATER

This is a continuation of application Ser. No. 903,506, filed Sept. 4, 1986, abandoned.

BACKGROUND OF THE INVENTION

The treatment of waste water such as sewage or other biodegradable materials under pressure by air or oxygen is known to the art.

Such treatment has been done as a batch process in a pressurized vessel as disclosed in U.S. Pat. No. 3,477,581 which issued to Donald M. Stearns.

While the process of U.S. Pat. No. 3,477,581 is an advance in the treatment of sewage and other waste water, it requires one or more relatively large pressurized tanks and is not suited for a continuous process or to systems for small communities which may otherwise use septic tanks and the like.

The pressurization of the waste water as disclosed in U.S. Pat. No. 3,477,581 will increase the absorption rate of the oxygen used, but requires closed tanks and is not suited for a continuous process.

SUMMARY OF THE INVENTION

Objects and Advantages

The apparatus of the present invention is a marked improvement on the prior art in that the continuous absorption of oxygen by the waste is made possible by the use of a recessed vortex type impeller, mis-matched with a casing which is termed a collector for this application.

The collector is oversized and back pressured to provide the absorption of oxygen by the waste under high agitation and pressure in the collector and achieves a maximum absorption rate of oxygen, created by a recessed vortex type of impeller, and by extending the duration of mixing and pressure in the collector.

The impeller/collector combination is designed for operation close to the shut-off pumping condition to increase the mixing rate and the retention time.

The inlet for air or oxygen under pressure encircles the waste water inlet in the collector to provide an annular air inlet. The two coaxial inlets are of a venturi type, to asperate air or oxygen directly in the waste water, as entering the collector and by back pressuring the collector by restricted nozzles at the outlet from the collector. The outlet nozzles lead from the collector to discharge into the waste water in which the collector may be immersed.

A principal advantage in the invention is in the economy and relatively small size plant made possible by the mixing of oxygen with the waste water as it enters a collector, and by back pressuring the collector to carry out the process in shorter time periods than former treatment process and in relatively low levels of water.

A principal object of the invention, therefore, is to increase the oxygen absorption of waste water by drawing air and waste water through coaxial inlets into an oversized collector or pumping chamber of a centrifugal pump, and by maintaining a back pressure in the collector by the outlet therefrom.

Another object of the invention is to utilize a recessed impeller type of pump to draw gas and waste water into a pumping chamber or collector and by throttling the discharge from the collector to pressurize the collector and thereby increase the retention time of the waste water in the collector.

A further object of the invention is to mix waste water with gas containing oxygen under pressure in a pumping chamber or collector in which the collector is mis-matched relative to the impeller for the pump and by back pressuring the discharge from the collector.

A still further object of the invention is to increase the oxygen absorption by waste water, by admitting oxygen and waste water into a pumping chamber or collector of a centrifugal pump through coaxial inlets leading to the vortex created by the impeller of the pump and by mis-matching the impeller with the collector to achieve a pump operating very close to its shut-off condition.

Still another advantage and object of the invention is to enhance the absorption of the oxygen by sewage or other oxidizable waste by utilizing a recessed impeller type pump, operating in conjunction with an oversize collector, and admitting sewage and oxygen under pressure through coaxial nozzles leading to the collector into the vortex created by the impeller.

A still further object of the invention is to increase the absorption of oxygen by sewage or other oxidizable waste by drawing the sewage into a collector of the pump and admitting gas through coaxial nozzles leading to the vortex created by the impeller and collector.

A further object and advantage of the invention is to mix gas and sewage under pressure in a more facile manner than formerly by mixing waste and oxygen in the vortex created by an impeller of a centrifugal pump, and creating a back pressure in the collector by utilizing a nozzle, or nozzles in series, at the outlet from the collector and retaining the sewage in the collector for a longer period than would be normal with a recessed impeller type pump of conventional design.

A further object of the invention is to achieve maximum oxygen absorption by sewage or other biodegradable waste materials, by utilizing the turbulence of the vortex of an impeller in a collector to effect mixing gas with sewage, and by holding the gas and sewage in the collector until complete absorption of the oxygen by the sewage is attained by the creation of a back pressure at the outlet from the collector.

These and other advantages and objects of the invention will appear from time to time as the following specification proceeds and with reference to the accompanying drawings wherein:

FIG. 4 is an enlarged sectional view showing the recessed impeller, the associated collector and inlet for oxidizing gas to the impeller, encircling the inlet through which sewage and oxidizing gas are drawn into the collector by the impeller.

FIG. 5 is a transverse sectional view taken substantially along V—V of FIG. 4.

DESCRIPTION OF THE PREFERRED EMBODIMENTS

Figure 1:
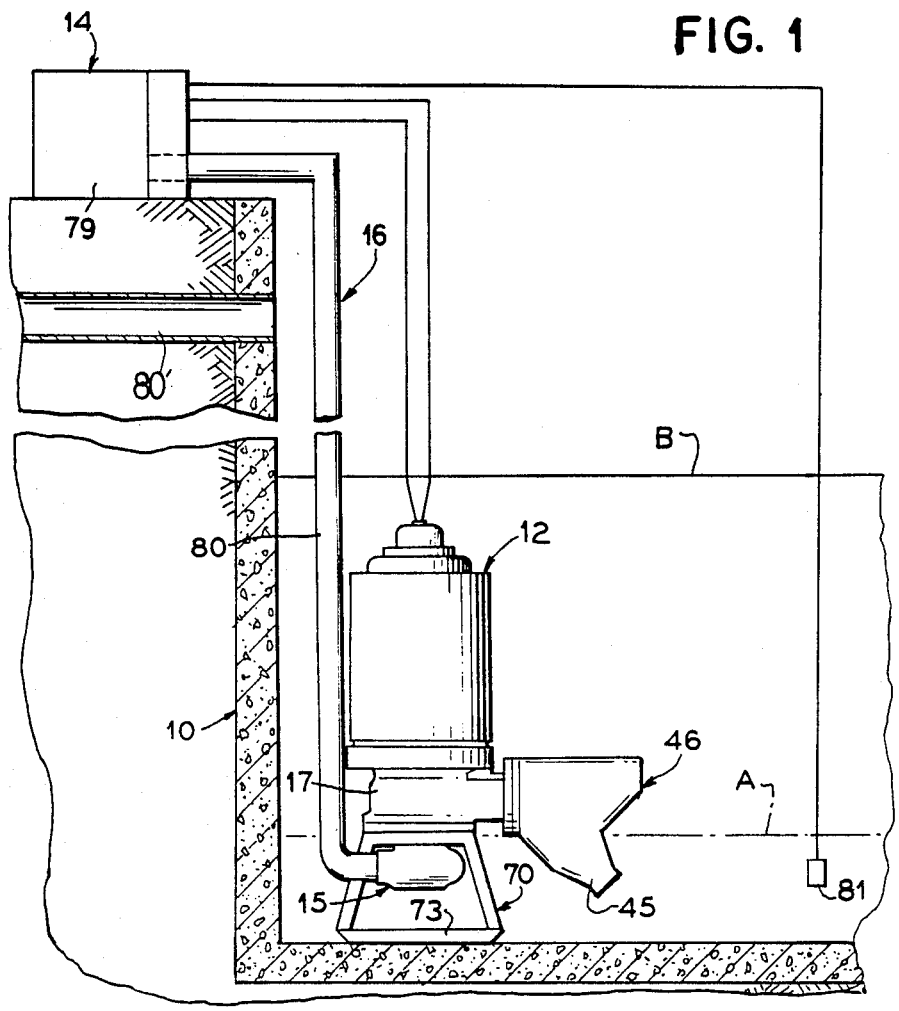
FIG. 1 is a diagrammatic view of a form of sewage treatment plant treating sewage on the principles of the present invention.

In FIG. 1 of the drawings, we have generally shown in diagrammatic form a type of sewage treatment plant in which the invention may be utilized.

Figure 2:
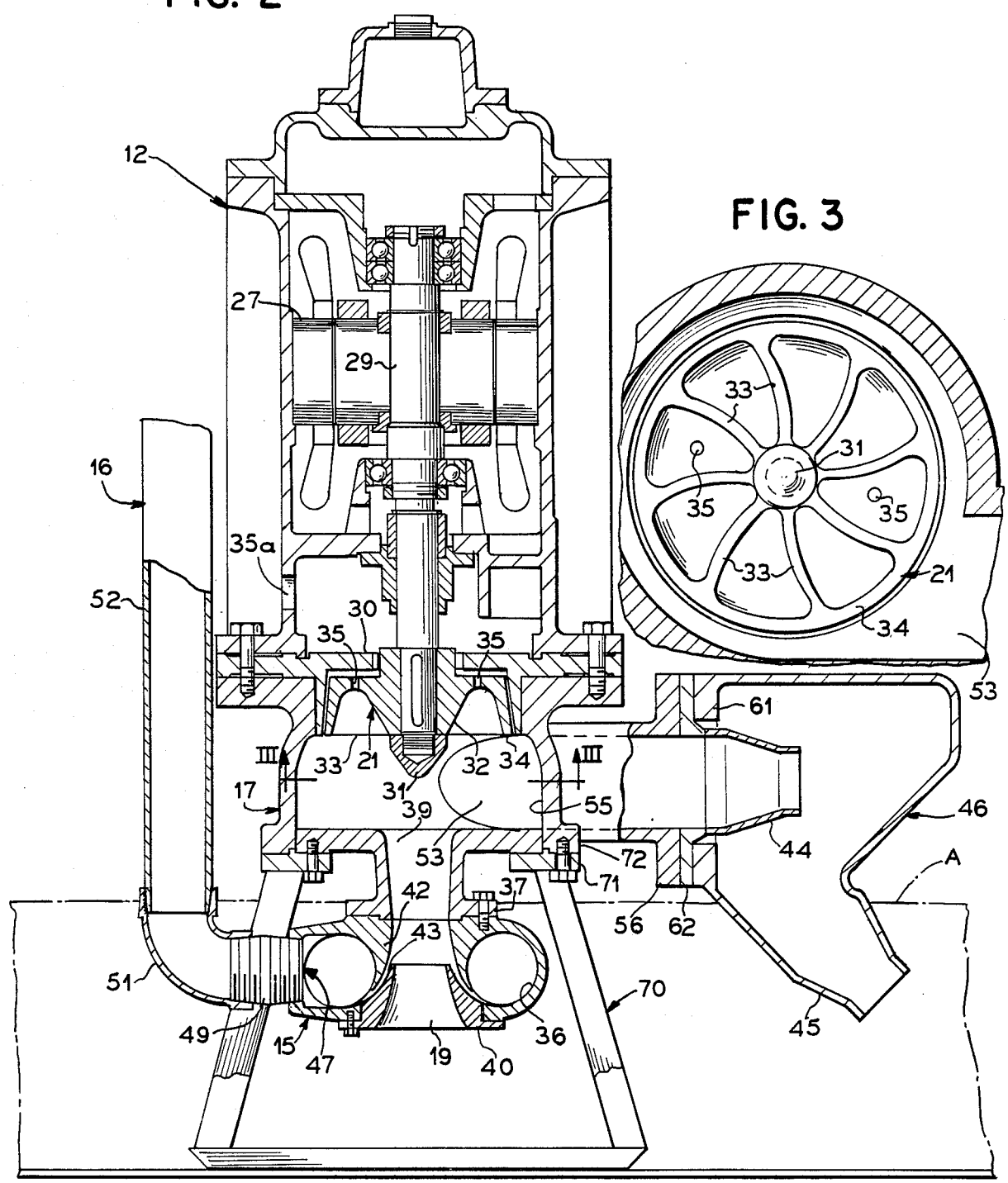
FIG. 2 is a cross-sectional view taken through the motor, impeller, collector and inlet to the collector, and also showing series back pressure outlets from the collector in section. The nozzles are shown as external to the collector to better illustrate the principle however the nozzle or nozzles may be physically incorporated into the collector casting.

The installation may include a tank 10 which may be a conventional tank similar to the tanks conventionally used in biodegradable sewage treatment systems, and having an oxygenator 12 like that illustrated in FIG. 2 of the drawings therein. A source of oxidizing gas, which may be air generally indicated by the reference numeral 14, including the controls therefor, may be located above the top of the tank and may have connection with an inlet fitting 15 shown in FIG. 2 as being an annular inlet fitting, but which may be a series of irregular apertures or holes.

The submergence of the oxygenator may be minimal and the minimum water level may be at level A indicated by broken lines in FIGS. 1 and 2 and just below the inlet to a collector 17.

Level B, which is the order of six feet above the bottom of the tank, is a normal level. The water and sewage, however, should not exceed thirty feet, it being understood that the maximum submergence is governed by the design of a venturi inlet for gas and the throat of a suction head for the material being treated.

The inlet 15 includes an annular throat of a venturi-like inlet opening, encircling an inlet opening 19 for sewage or other biodegradable waste material. At low fluid levels, the induction of air through the throat of the venturi is because of the reduced pressure in the throat, which occurs in accordance with Bernoulli's theorem. The velocity head ($V^2/2$ g) must, however, exceed the submergence in order for air to be induced into the inlet.

The oxygenator 12 is primarily a mis-matched vortex type pump in which the collector is mis-matched relative to the impeller. The pump itself may be of a type manufactured by Barrett, Haentjens & Company and the form shown is similar to the Barrett, Haentjens type VNR Recessed Impeller Pump in which the pumping chamber is matched relative to the impeller. Other pumps, however, may be used.

Air or other gas containing oxygen is induced into the collector 17 through the inlet 15 because of the reduced pressure in the throat of the annular venturi. While the velocity head ($V^2/2$ g) of air must exceed the submergence of the inlet in the water, with a minimum water level, the velocity head need only be sufficient to overcome the submergence. Where air or oxygen is forced into the inlet surrounding the sewage inlet, then the submergence limitation is not necessary.

The casing or collector 17 is excessively large relative to conventional pump casings and the inlets and outlets interact to create a back pressure in the casing. The agitation caused by the impeller and the pressure within the casing results in a rapid absorption rate of oxygen by the biodegradable waste, as will hereinafter more clearly appear as this specification proceeds. The oxygenator otherwise may be a pump operating close to shut-off conditions.

Referring now in particular to the general structure of the oxygenator, the pump is shown in FIG. 2 as a vertical axis pump directly driven from a motor 27, of a type which will efficiently operate when submerged in water. The motor has a shaft 29 suitably journalled in the housing for said motor and extending through a wearplate 30 into the upper portion of the collector 17. The impeller 21 may be keyed or otherwise secured to the lower end of the shaft 29, and held to said shaft by a nut 31 threaded thereon and engaging a hub 32 of said impeller.

Figure 3:
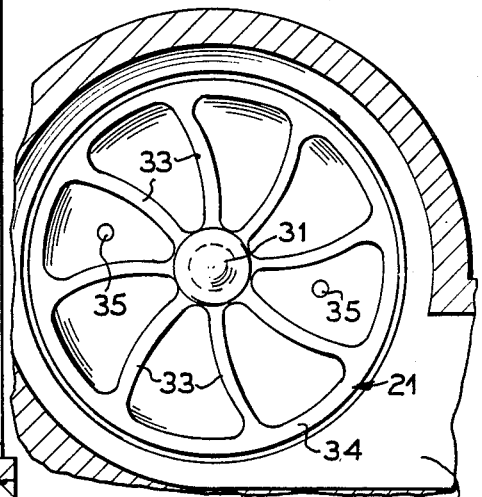
FIG. 3 is a fragmentary sectional view taken substantially along line III—III of FIG. 2.

As shown in FIGS. 2 and 3, the impeller 21 has a peripheral rim 34 and is recessed inwardly or upwardly relative to said rim, to provide space for blades 33 extending from the hub 31 to said rim and shown in FIG. 2 as being integral with said hub and rim. Clearance is provided between the back of the impeller and also between said rim and an annular extension from the wearplate 30 and between an upward extension of the hub 32 and the wearplate to avoid binding of the collector. Air relief holes 35 lead from the bases of certain impeller vanes 33 to prevent air binding of the impeller.

As previously mentioned, the inlet 15 into the collector may be an annular inlet fitting 36 secured to and depending from a flange 37 of an inlet fitting 39 for biodegradable waste. Air or oxygen thus is mixed as admitted into the interior of the collector 17 along an axis coaxial with the center of rotation of the impeller 21. The exterior wall 43 of the annular air inlet fitting 36 in cooperation with the exterior wall of the fitting 42 is shown as being of a venturi-like form and opens to the waste inlet passageway, and with an exterior wall of the fitting 40 forms a venturi-like inlet to the fitting 39 within and in axial alignment with the inlet 39 to the collector 17 and the vortex created by the impeller 21.

As shown, in FIGS. 2 and 4, the inlet member 36 has an inlet port 47 leading thereinto, diametrically of the inlet axis of fluid into the collector 17. The port 47 has a coupler 49 threaded therein. The coupler 49 is threaded along each end. The opposite end of the said coupler from the port 47 is shown as having an elbow 51 threaded thereon and connected to an inlet pipe 52 for air or oxygen, which need or need not be under pressure, depending upon the water level relative to said inlet.

FIG. 5 illustrates in cross section the concentric openings for air or oxygen into the inlet passageway 39 in alignment with the center of the vortex created by the impeller 21 and shown as leading downwardly from the bottom of the collector 17. The venturi-type of air or oxygen admission through the annular inlet passageway defined by the space between the annular inlet 15 and the inlet for biodegradable material, such as sewage, will achieve a maximum amount of oxygen absorption by the turbulence created by the vortex impeller 21 and the coaxial nozzles 19 and 15 and resultant pressure in the collector.

Figure 6:
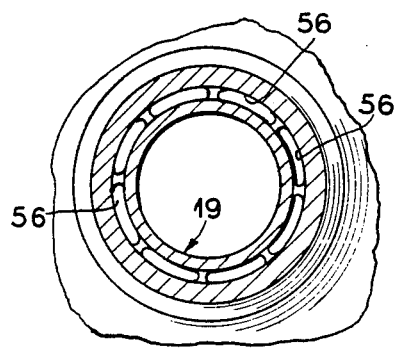
FIG. 6 is a sectional view similar to FIG. 5 but showing a modified form in which oxidizing gas and waste nozzles may be embodied.

It should be understood that the coaxial nozzles 19 and 15 need not form an annular converging slot but that a series of slots may instead be used to provide an inlet for air or oxygen with the biodegradable material entering the inlet passageway 39, into the collector 17 along an axial coaxial with the axis of rotation of the impeller 21. FIG. 6 illustrates annular slots 56 as an alternative form of nozzle opening for air or oxygen into the collector. The slots may be as shown in FIG. 6. It should be understood, however, that the length of the slots may vary, and the edges thereof may come together to form circular holes.

As previously mentioned, a maximum retention period for the air and biodegradable material in the collector is attained by mis-matching the collector with respect to the impeller, and by back pressuring the collector through the nozzles 44 and 45 or a nozzle box 46. An outlet passageway 53 leads from an internal wall 55 of the collector, and extends beyond the external wall of the collector 17. The outlet passageway 53 is flanged at its outer end, as indicated by reference numeral 56 and is shown in FIG. 4 as leading to the back pressure nozzle 44 shown as having a converging discharge end large enough to permit particle passage. The nozzles 44 and 45 cooperate with each other to not only create a back pressure in the nozzle box 46 but to provide a maximum nozzle size for particle passage.

As shown in FIGS. 4 and 5, the nozzle box 46 has an internal annular flange 61 abutting an annular flange 62 of the nozzle 44. Cap screws 63 or other securing means may secure the flanges 56, 62 and 61 to the outlet from the collector. Suitable seals (not shown) may also be provided to seal the flange 62 to the flange 56 and the flange 61 to the flange 62 if desirable. Seals, however, should not be necessary where the flanges are properly seated and the cap screws 63 are drawn tight to tightly engage said flanges with each other.

It should here be understood that while we have shown a back pressure or a pressure breakdown device in the form of a nozzle box 46 containing two converging nozzles in series, that any other type of pressure breakdown device may be substituted at the outlet of the collector. As previously mentioned, the nozzle or nozzles in series may be integrally cast as a part of the collector. The diameter of the outlet of the nozzle 44 is as large as possible consistent with the hydraulic conditions of the impeller/collector combination. If the calculated back pressure cannot be achieved by a single nozzle of the desired diameter, then two or more nozzles may be used in series since their losses are additive. In this way, the nozzles can pass approximately the same size solid as will pass through the inlet nozzle 19.

The oxygenator 12 is shown in FIGS. 1, 2 and 4 as supported to extend vertically from a stand 70 formed by an annular ring 17 abutting an annular flange 72 of the collector 17. The ring 71 extends radially inwardly of the inner wall of the collector 17 and serves to secure the inlet fitting 19 in engagement with the inlet 39 to the collector and also to secure said ring to a flange 72 of the collector 17. The ring 71 is shown in FIGS. 3 and 4 as having legs flaring outwardly therefrom and secured at their bottoms to an open rectangular ground engaging base 73. The base 73 need not be rectangular but may be in the form of spaced ground engaging skids, although for stability, a rectangular base is preferred. It should be understood that the oxygenator need not be mounted on a base but may be secured to a wall of the treatment tank in which it is operating and may also be mounted on any other form of a base desired or required for a particular treating system.

FIG. 1, as previously mentioned, diagrammatically illustrates a simple form of treating plant in which the invention may be carried out. The plant of system may include an oxygenator 12, which may be similar to that shown and described in the description of FIGS. 2 to 6 of the drawings. In FIG. 1, broken line A indicates the minimum water level in which the oxygenator is effective. The water level, however, may submerge the oxygenator including the drive motor therefor, it being understood that the higher the water level, the greater the velocity head of air or oxygen required to overcome the submergence of the oxygenator. In most cases, the velocity head of the air or oxygen need only be great enough to overcome the submergence, and the system may be effectively carried out in this low water level.

79 indicates a source of air or oxygen under pressure. Where air is used, the source may be an air compressor controlled by suitable controls well known to those skilled in the art so not herein shown or described.

An inlet pipe 80 for biodegradable material is shown as leading into the tank 10.

Biodegradable material preferably enters the collector 17 of the oxygenator through a venturi-like nozzle, like the nozzle 19 and in direct alignment with the axis of rotation of the impeller 21. As previously described, the supply of oxygen or air is supplied by an annular nozzle extending about the outside of the biodegradable material inlet 19, to effect a circulation of the air and oxygen to the collector. This creates an agitation of the oxygen and biodegradable material as passing along the passageway 39 and as discharged into the collector 17, to further be agitated for a longer period of time than possible with normal pumps, due to the mis-matching of the collector with the impeller aided by the back pressure created by the nozzles 44 and 45 in series, and leading into and from said nozzle box 46.

With the foregoing arrangement of sewage and air or oxygen inlets leading to the collector 17, and the agitation created by the vortex of the impeller 21, as well as the back pressure created by the nozzle box 46 and the venturi-like nozzles 44 and 45, a thorough mixing of oxygen or air with the sewage is attained in a far shorter time than has heretofore been considered possible.

Operation may be controlled by a conventional form of oxygen demand probe 81 indicating the absorption of oxygen into the material being treated or other type of process demand control and not described herein since the controls may be of any well known form.

It is here desired to point out that the form of oxygenator used may be varied in accordance with treating conditions and that we do not desire to be limited to the particular oxygenator shown. Various other types of oxygenators which will agitate and cause the air or oxygen to be absorbed in biodegradable liquid as constructed under the principles shown and described herein and coming under the scope of the claims of the present invention, may be attained without departing from the spirit and scope of the novel concepts thereof.

We claim as our invention:

1. An apparatus for effecting the absorption of oxygen by a biodegradable waste in a continuous operation, comprising: a pump having a impeller, means for rotatably driving said impeller, a collector enclosing said impeller and creating a relatively large volume chamber mismatched relative to said impeller, a first inlet in fluid communication with a source of biodegradable waste and disposed in said collector axially of said impeller, a second inlet in fluid communication with a source of air including oxygen and extending around said first inlet for biodegradable waste, said first and second inlets cooperating with a vortex created by said impeller to effect agitation of air and biodegradable waste entering said collector, and an outlet leading from said collector in fluid communication with a means for providing increased back pressure in said collector and forming, in cooperation with said first and second inlets and said impeller, means for impeding axial flow of said biodegradable waste through said outlet by increasing the dwell time of said biodegradable waste in said collector to effect a thorough absorption of oxygen from the air and particle break-up of the biodegradable waste prior to discharge through said outlet.

2. An apparatus of claim 1, wherein said impeller of said pump is a recessed vortex-type impeller.

3. An apparatus of claim 1 in which said back pressure increasing means has a diameter that is approximately the same diameter as a throat of said first inlet.

4. An apparatus of claim 3, in which said back pressure increasing means includes two back pressure nozzles in series and of diameters to permit particle passage therethrough.

5. An apparatus for the treatment of biodegradable waste, comprising: a recessed vortex-type impeller, means rotatably driving said impeller, a collector in which said impeller is disposed being mis-matched relative to said impeller and with said impeller forming a pump chamber having less than a theoretically available maximum efficiency, inlets respectively in fluid communication with sources of air and biodegradable waste and entering said collector in axially aligned relation with respect to a vortex of said vortex-type impeller, and means for creating a back pressure including an outlet leading from said collector to increase pressurization of said collector and delay of withdrawal of biodegradable waste therefrom.

6. An apparatus as claimed in claim 5, wherein said inefficient pump chamber operating with said means for creating a back pressure in combination form a means for reducing flow of biodegradable waste through said outlet to less than 60% of a flow rate which would be produced at said theoretically available maximum efficiency.

7. An apparatus as claimed in claim 5, wherein said collector has a volume that is at least 35% larger than a volume which would produce said theoretically available maximum efficiency when operated as a pump.

8. In an oxygenator for organically reducing biodegradable waste, an agitator comprising a recessed impeller having impeller vanes in a recessed portion thereof, a collector enclosing said impeller and defining a relatively large volume chamber mismatched relative to said impeller, coaxial inlets respectively in fluid communication with sources of air and biodegradable waste and leading into said collector to effect mixing of the biodegradable waste with the air in a vortex in said chamber created by said impeller, and means creating a back pressure including an outlet adapted to pass said biodegradable waste therethrough leading from said collector to pressurize said collector and increase a time of retention of the biodegradable waste discharged through said outlet.

9. An apparatus of claim 8, further comprising air holes leading through the recessed portion of said impeller to prevent air binding thereof.

10. An apparatus of claim 8, wherein an outer one of said coaxial inlets is for air and encircles an inner one of said coaxial inlets for biodegradable waste said inner and outer inlets are coaxial venturi-type nozzles to achieve maximum oxygen absorption by turbulence created in a vortex by said impeller, and said venturi-type nozzles having a venturi throat for biodegradable waste and air designed to produce a velocity head which off-sets submergence of an air inlet nozzle of said coaxial venturi-type nozzles.

11. An apparatus of claim 8, further comprising: means for breaking up of the biodegradable waste in said collector by virtue of a high degree of agitation caused by said impeller operating at close to zero flow conditions.

12. A process which permits a continuous pressurized process for increasing the absorption rate of oxygen and particle break-up of biodegradable waste, comprising the steps of: establishing a collection and agitation zone for collecting biodegradable waste mixed with air, said collection and agitation zone having an impeller disposed in a chamber having a volume mis-matched relative to said impeller, and having a discharge, drawing the air and biodegradable waste into the collection and agitation zone along a same axis, vigorously mixing the air and biodegradable waste drawn into the collection and agitation zone by rotating said impeller in said chamber to create agitation in said collection and agitation zone, extending the time of retention of the biodegradable waste in the collection and agitation zone by generating back pressure at said discharge to aid in absorption of oxygen and particle break-up, then discharging said biodegradable waste from the collection and agitation zone through said discharge.

13. A process for operating an oxygenator under continuous pressurization for increasing the absorption of oxygen in, and particle break-up of, biodegradable waste, comprising the steps of:
   drawing air and biodegradable waste into a collection and agitation zone having an impeller therein mismatched with respect to a volume of said collection and agitation zone;
   rotating said impeller in said collection and agitation zone to intentionally produce cavitation and turbulence for vigorously mixing the air and biodegradable waste in said collection and agitation zone due to the mismatching of said impeller and said volume of said collection and agitation zone;
   retaining the biodegradable in the collection and agitation zone to aid in the absorption of oxygen and particle break-up; and
   discharging said biodegradable waste from the collection and agitation zone through a discharge.

* * * * *